(12) United States Patent
Ni et al.

(10) Patent No.: US 7,407,393 B2
(45) Date of Patent: Aug. 5, 2008

(54) SUPER SLIM COMPACT FLASH (CF) LIGHT UNIVERSAL SERIAL BUS (USB) DEVICE

(75) Inventors: Jim C. Ni, San Jose, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 11/739,245

(22) Filed: Apr. 24, 2007

(65) Prior Publication Data
US 2007/0197101 A1  Aug. 23, 2007

Related U.S. Application Data

(63) Continuation-in-part of application No. 11/257,575, filed on Oct. 24, 2005, now Pat. No. 7,249,978, and a continuation-in-part of application No. 10/990,887, filed on Nov. 16, 2004, now Pat. No. 7,301,776, and a continuation-in-part of application No. 09/478,720, filed on Jan. 6, 2000, now Pat. No. 7,257,714.

(51) Int. Cl.
*H01R 13/14* (2006.01)

(52) U.S. Cl. .......... 439/131; 439/67; 361/752; 361/785; 361/737; 361/727; 361/715

(58) Field of Classification Search ............ 439/131, 439/67; 361/752, 785, 737, 715, 801, 802, 361/803
See application file for complete search history.

(56) References Cited

U.S. PATENT DOCUMENTS

| | | | |
|---|---|---|---|
| 6,567,273 B1 * | 5/2003 | Liu et al. ............ | 361/737 |
| 6,655,017 B1 * | 12/2003 | Formwalt et al. ...... | 29/832 |
| 7,037,119 B2 * | 5/2006 | Collins ............ | 439/131 |
| 7,092,256 B1 * | 8/2006 | Salazar et al. ....... | 361/737 |
| 7,287,705 B2 * | 10/2007 | Tang ............. | 235/492 |
| 7,295,431 B2 * | 11/2007 | Chuang ........... | 361/683 |
| 7,307,849 B2 * | 12/2007 | Ho et al. ........... | 361/737 |
| 2004/0063346 A1 * | 4/2004 | Lin et al. ........... | 439/131 |
| 2005/0090133 A1 * | 4/2005 | Ma ................ | 439/131 |
| 2005/0204086 A1 * | 9/2005 | Le et al. ............ | 710/301 |
| 2006/0211283 A1 * | 9/2006 | Weng ............. | 439/131 |
| 2007/0111583 A1 * | 5/2007 | Cuellar et al. ........ | 439/353 |
| 2007/0143509 A1 * | 6/2007 | Ni et al. ............ | 710/100 |

\* cited by examiner

*Primary Examiner*—Hoa C Nguyen
(74) *Attorney, Agent, or Firm*—Law Offices of Imam (57) ABSTRACT

An embodiment of the present invention includes a super slim compact flash (CF) light Universal Serial Bus (USB) device having a top cover, a top cover slot formed within the top cover and forming a top cover slot cavity, a sliding plug connector positioned within the cavity and flexibly movable therein, a plastic frame disposed below and around the top cover, a retractable slim USB plug connector sub-assembly on top of which and connected thereto is placed the sliding plug connector, the sub-assembly including a retractable slim USB plug connector positioned within the device to be flexibly retracted from or pulled into the device by the sliding plug connector for causing connection to a mating USB plug connector.

24 Claims, 6 Drawing Sheets

SUPER SLIM COMPACT FLASH (CF) LIGHT UNIVERSAL SERIAL BUS (USB) DEVICE

CROSS REFERENCE TO RELATED APPLICATIONS

This application is a continuation-in-part of U.S. patent application Ser. No. 09/478,720, entitled "Electronic Data Storage Medium With Fingering Verification Capability", filed on Jan. 6, 2000 now U.S. Pat. No. 7,257,714 and is a continuation-in-part of U.S. patent application Ser. No. 10/990,887, entitled "Light-Weight Flash Hard Drive With Plastic Frame", filed on Nov. 16, 2004 now U.S. Pat. No. 7,301,776 and is a continuation-in-part of U.S. patent application Ser. No. 11/257,575, entitled "Reduced-Length, Low-Profile USB Device and Card-Like Carrier", filed on Oct. 24, 2005, now U.S. Pat. No. 7,249,978 the disclosures of all of which are incorporated herein by reference, as though set forth in full.

BACKGROUND OF THE INVENTION

1. Field of the Invention

The present invention relates generally to compact flash light Universal Serial Bus (USB) devices and particularly to such a device with a retractable slim USB plug connector.

2. Description of the Prior Art

Compact flash (CF) devices have enjoyed popularity in recent years, both due to their compactness as well as their portability. CF devices, which typically include non-volatile memory, such as flash memory, also typically include a USB connector used for coupling to various devices using the same type of connection. Examples of such devices are consumer devices, such as portable music and other types of mobile digital or electronics devices, such as but not limited to Personal Computers (PCs). CF USB devices are coupled to serve as an external disk drive for transferring files and many other applications in the foregoing consumer or electronics devices.

The portability of CF devices with USB connection, as can be appreciated, offers great convenience to the user of such devices. Moreover, for obvious reasons, the lighter and/or slimmer design of such devices, makes their transportability easier. Currently, improvement is required to further advance the portable characteristic of CF USB devices.

Another concern surrounding CF USB devices is their lack of durability as they are subject to potentially harsh environments and treatment during the course of their transport by a user of such devices. To this end, a current CF USB device having a USB connector extending outwardly from the CF card is subject to less than desirable care, resulting in the suffering of scratches, nicks and so forth. Thus, durability and long-lasting characteristic is an issue.

Yet another problem with prior art devices is that the USB connector must be secured by using a cap or similar device to physically secure the connector and avoid potential damage thereto.

What is therefore needed is an improved CF light-weight USB device having a retractable and slim USB connector.

SUMMARY OF THE INVENTION

Briefly, an embodiment of the present invention includes a super slim compact flash (CF) light Universal Serial Bus (USB) device having a top cover, a top cover slot formed within the top cover and forming a top cover slot cavity, a sliding plug connector positioned within the cavity and flexibly movable therein, a plastic frame disposed below and around the top cover, a retractable slim USB plug connector sub-assembly on top of which and connected thereto is placed the sliding plug connector, the sub-assembly including a retractable slim USB plug connector positioned within the device to be flexibly retracted from or pulled into the device by the sliding plug connector for causing connection to a mating USB plug connector.

These and other objects and advantages of the present invention will no doubt become apparent to those skilled in the art after having read the following detailed description of the preferred embodiments illustrated in the several figures of the drawing.

DETAILED DESCRIPTION OF THE PREFERRED EMBODIMENT

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention.

In an embodiment of the present invention, a super compact flash (CF) light USB device with retractable slim USB plug connector is disclosed allowing for a compact and easy-to-carry design for a user thereof. The plug connector may be a male connector or a female connector for causing electrical connection with a mating USB connector or another USB device.

Figure 1:
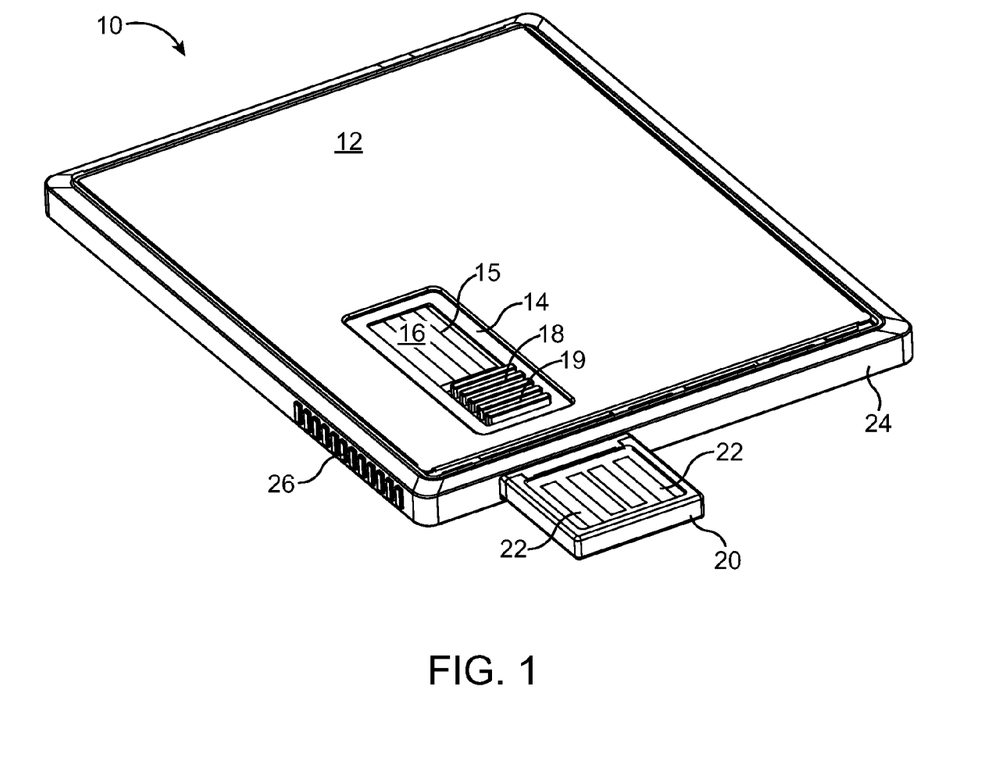
FIG. 1 shows a perspective top angular view of a super slim compact flash (CF) light Universal Serial Bus (USB) device 10 with a retractable slim USB plug connector 20, shown in the 'open' position, in accordance with an embodiment of the present invention.

Referring now to FIG. 1, a top perspective view of a super slim compact flash (CF) light Universal Serial Bus (USB) device 10 with a retractable slim USB plug connector 20 (in a subsequent figure, referred to as retractable slim USB plug connector sub-assembly 60), is shown in the 'open' position, in accordance with an embodiment of the present invention.

Figure 2:
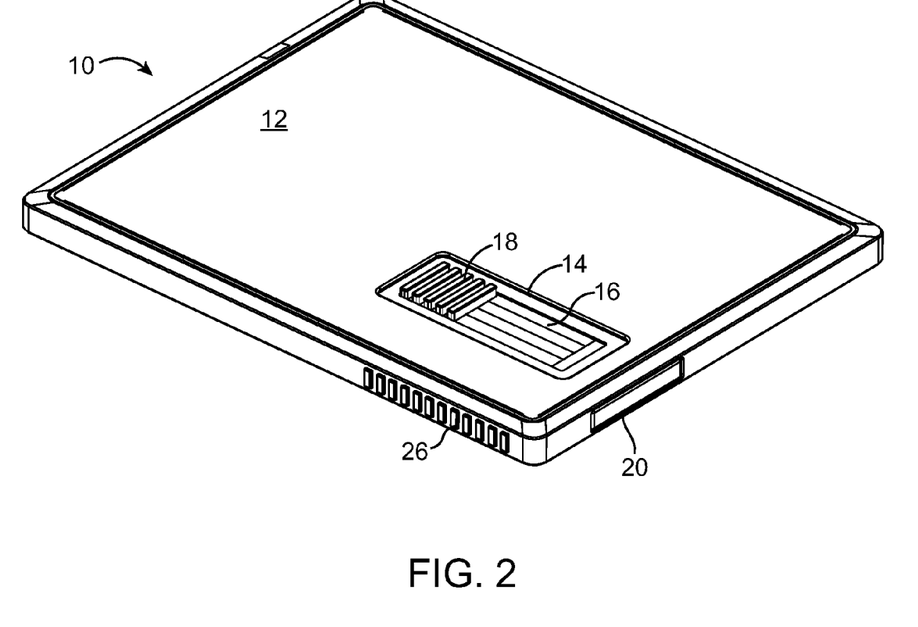
FIG. 2 shows a perspective top angular view of the super slim compact flash (CF) light Universal Serial Bus (USB) device 10 with a with a retractable slim USB plug connector 20, shown in the 'closed' position, in accordance with an embodiment of the present invention.

'Open' position refers to the retractable slim USB plug connector 20 being extended outwardly from the device 10, whereas, 'closed' position refers to the retractable slim USB plug connector 20 being positioned within the device 10 (or retracted), as shown in FIG. 2.

In FIG. 1, the retractable slim USB plug connector 20 is positioned within the device 10 so as to be flexibly retracted from or pulled into the device 10 for causing connection to a USB female plug connector. It should be noted that while the figures and discussions herein refer to a male plug connector, a female plug connector may be used and is anticipated. In the case of the latter, the female plug connector causes connection with another USB device, with the latter's male connector.

The device 10 is shown to include a top cover 12, a top cover slot 14, a top cover slot cavity 16, a sliding plug connector 18, a plastic frame 24, case grip notches 26, a retractable slim USB plug connector 20 and connector connection pads 22.

The top cover 12 is shown positioned on top of the plastic frame 24. The top cover 12 is shown to include a top cover slot 14 formed in close proximity to an edge of the device 10 and is shown rectangular in shape, although other types of shapes are anticipated. The top cover 12 further is shown to include a top cover slot cavity 16 formed within the top cover slot 14 to allow an opening into the top cover 12 into which a mechanism for flexibly moving the retractable slim USB plug connector 20 back and forth into and out of the top cover 12 may be placed. Such a mechanism is the sliding plug connector 18, which can be moved vertically or up and down the top cover slot cavity 16 for retracting or extending outwardly the retractable slim USB plug connector 20. The sliding plug connector 18 is shown to have notches 19, which allow for a sturdy grip or touch of the sliding plug connector 18 prior to movement thereof. The notches 19 are optionally and may be replaced with a smooth surface, although, the latter is more difficult to move.

The retractable slim USB plug connector 20 is shown to include connector connection pads 22, which cause electrically coupling onto a USB female plug connector of a device or a system into which the device 10 is adaptably connected. The retractable slim USB plug connector 20 may be removably inserted into the USB female plug connector of a system or device into which the device 10 is connected and the connector connection pads 22 cause electrical coupling with the system. The connector connection pads 22 are connected to a connection wire 15 for coupling signals received from the connector connection pads 22 to a printed circuit board assembly (PCBA) shown in subsequent figures.

The device 10 is shown to further include a plastic frame 24 placed below and around the top cover 12. The top cover 12 is placed onto the plastic frame 24 by alternative mechanisms, discussed with reference to subsequent embodiments of the present invention. The plastic frame 24 is shown to include the notches 26 dispersed on a partial side of the plastic frame 24, which allows for easier grip of the device 10 particularly when the device 10 is being inserted or removed from a system, using the retractable slim USB plug connector 20.

The device 10 is generally super compact and slim, as is the retractable slim USB plug connector 20. In one embodiment of the present invention, the dimensions of the device 10 are 48×62×3.5 milli-meters although other dimensions may be employed.

Figure 3:
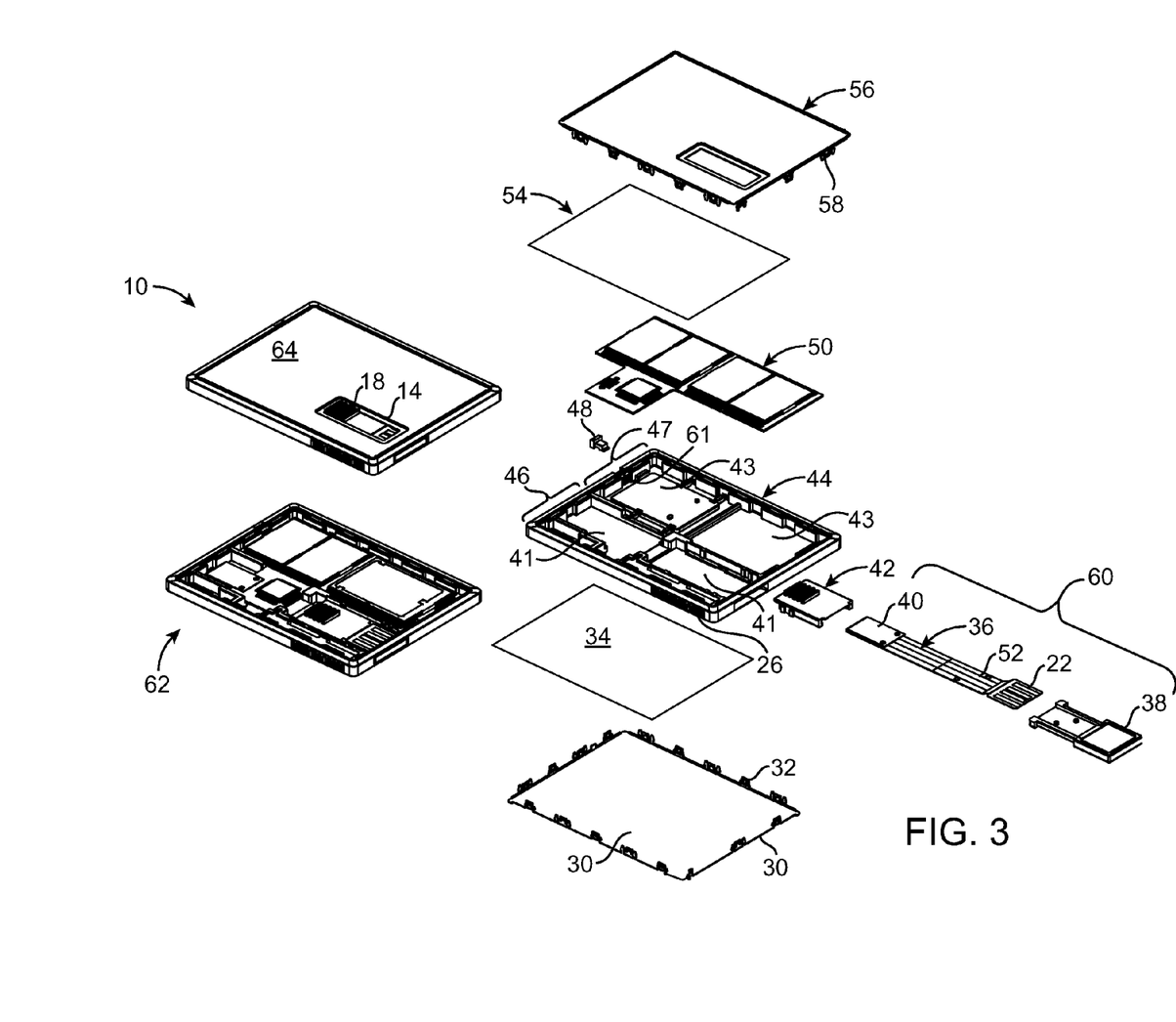
FIG. 3 shows further details of the components of the device 10, in accordance with an embodiment of the present invention.

In FIG. 3, the sub-assembly 60 is shown to include connector connection pads 22, connection wire 52, a flexible cable 36 and a flexible cable connector 40, the connector connection pads 22 are for fitting into the slim USB male plug connector 38 for establishing electrical connection with another USB device. The connection wire 52, shown extending and connected between the connector connection pads 22 and the flexible cable connector 40 are for coupling the connector connection pads 22 to the flexible cable connector 40 through the flexible cable 36.

Another advantage of the device 10 in addition to its compactness and therefore ease-of-carry is that due to its retractable USB male plug connector, no cap is needed for securing the plug connector, such as that which is used in prior art devices. That is, retracting the retractable slim USB plug connector 20 leaves no need for a cap to be placed thereon to secure the same because when the retractable slim USB plug connector 20 is connected to another USB device, it is or should be securely connected and when it is not connected to another device, it may be retracted to fit substantially completely within the device 10 thereby eliminating any need connection wire 52 (or the connection wire 15, which is the same as the connection wire 52) extending therebeyond and into a flexible cable 36 shown interposed substantially between the connector connection pads 22 and a flexible cable connector 40. The retractable slim USB male plug connector sub-assembly 60 is shown pushed back and inserted into the cavities 41 of the frame 44 and in an area located to the left of the frame 44, as indicated generally at 46. The frame 44 is shown to include the case grip notches 26, as earlier discussed.

The connector connection pads 22 is inserted into the slim USB male plug connector 38 and together they removably connect to a counterpart USB female plug connector. The flexible cable 36 is a flexible cable substrate that is mounted onto the connector connection pads 22 and includes connection wire 52, which couple electrical signals received through the connector connection pads 22 to the PCBA 50 when the device 10 is connected to another USB device. The flexible cable 36 is shown interposed between the flexible cable connector 40 and the connector connection pads 22. The slim USB male plug connector 38 is made of plastic material in one embodiment of the present invention, however, alternatively, it may be made of metal. The sub-assembly 60 is mounted onto the PCBA 50 and then placed onto the frame 44.

In an area generally located on the left side of the frame 44 and within the cavities 48, the PCBA 50 is placed and essentially snapped into place to sit within the cavities 43 of the frame 44.

While not shown, flash memory integrated circuit (IC) is mounted onto the PCBA 50, as well as potentially other types of ICs. The mounted ICs may be mounted on a single side of the PCBA 50 or on both sides thereof, i.e. double-sided, as in Thin Small Outline Package (TSOP) although chip on board (COB), Ball Grid Array (BGA) or other types of IC mounts may be employed. Examples of COB and double-sided PCBA 50 are shown with respect to other figures.

In FIG. 3, which shows further details of the components of the device 10, in accordance with an embodiment of the present invention, once the PCBA 50 is inserted into the frame 44, the top isolation layer 54 may be optionally attached to the top metal panel 56, which is similar to the bottom metal panel 30. In one embodiment of the present invention, the top isolation layer 54 is not employed. Next, as previously explained, the top metal panel 56 is aligned and inserted into the engagement holes of the frame 44, which effectively closes the structure comprising the device 10 or as indicated in FIG. 3, the final assembly 64. A sub-assembly 62 is shown in FIG. 3 to provide a perspective angular view of the device 10 when the top cover is removed.

Optionally, the frame 44 includes a cutout hole 61 such that a light, for example Light Emitting Diode (LED) or light pipe 48 is mounted on the PCBA 50 and visible from the backside of the device 10. The light pipe 48 reflects a light that which depending on its state of either on or off is indicative of the operational state of the device 10. Still optionally, the top isolation layer 54 and bottom Isolation layer 34 may be affixed to their respective layers. For example, the top isolation layer 54 may be affixed to the top metal panel 56 and the bottom Locking finger 32 may be affixed to bottom metal panel 30.

In FIG. 3, after insertion and placement of the retractable slim USB male plug connector sub-assembly 60 within the frame 44, the plug connector 42 is pressed to cover the slim USB male plug connector 38 on the top side of the frame 44 encompassing the frame 44 in a manner as to make sufficient physical contact for the plug connector 42 to be able to cause the slim USB male plug connector 38 to move up and down the top cover slot 14.

The flexible cable 36, in one embodiment of the present invention, is made of Kapton material to flexibly extend or retract following the movement of the slim USB male plug connector 38. The PCBA, in one embodiment of the present invention is made of FR4 material. It should be noted that the top metal panel 56 is the same as the top cover 12 of FIG. 1.

Figure 4:
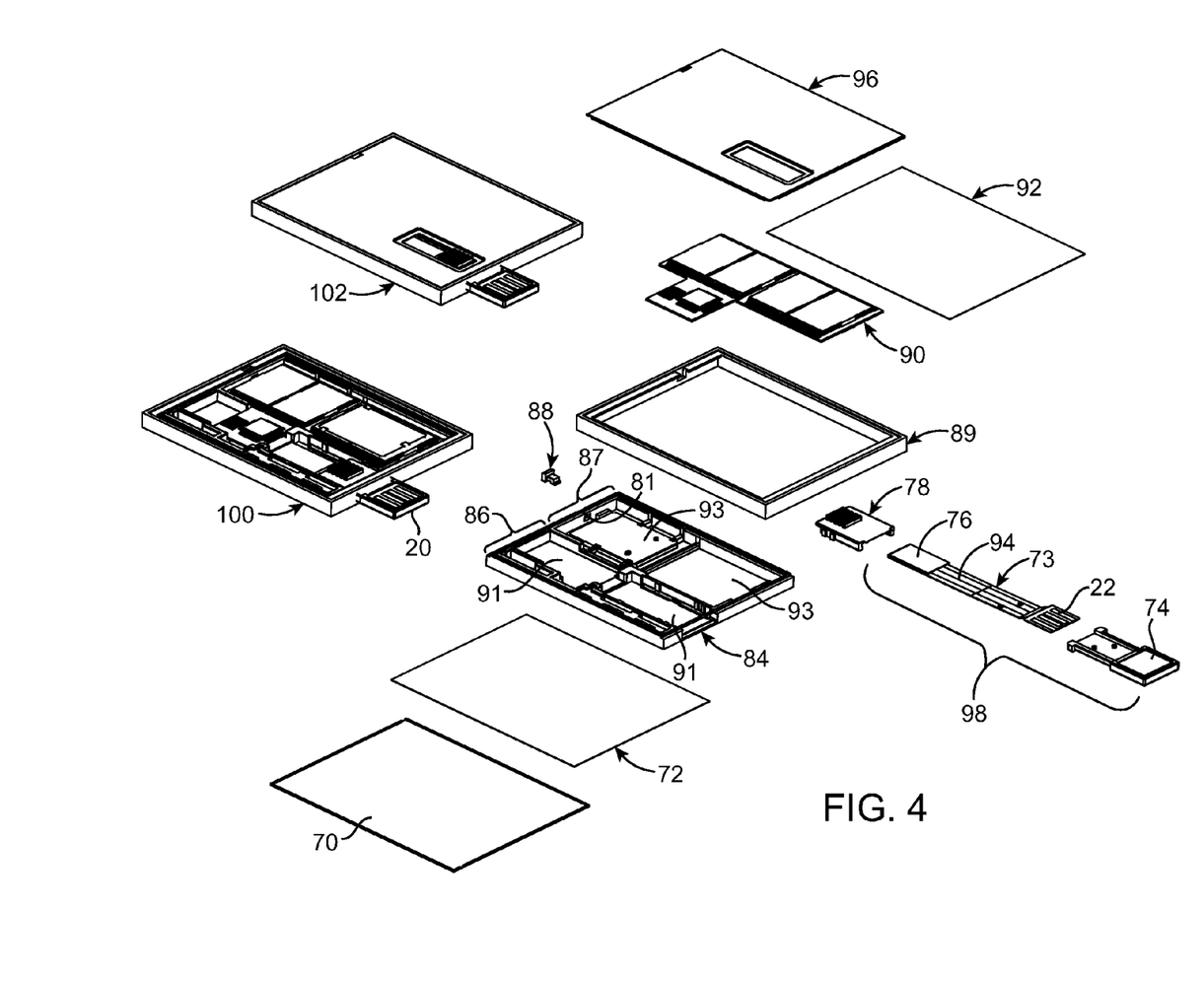
FIG. 4 shows components within and comprising the super slim CF USB device of FIGS. 1 and 2, in accordance with an alternative embodiment of the present invention.

FIG. 4 shows further details of the components of the device 10, in accordance with another embodiment of the present invention. In FIG. 4, the various components of the device 10 will be described relative to an order used to build the device 10. In FIG. 4, a bottom metal panel 70 is shown and a top panel 96 is shown in between which are placed the remaining components of the device 10, as shown in FIG. 4. In one embodiment of the present invention, the top and bottom panels are made are metal, as are the top and bottom panels of the embodiment of FIG. 3. The top and bottom panels serve to secure the sub-assembly 100 therein and more particularly to form an enclosure with the PCBA 90 therein and to secure the sliding plug connector 78 positioned on the top surface of the device 102 or 10 of FIG. 1.

The components of the embodiment of FIG. 4 are similar to that of the embodiment of FIG. 3 except that the top and bottom isolation layers 54 and 34 of FIG. 3 are replaced with the top and bottom thermo-bond film 92 and 72. Also, the top metal panel 96 and the bottom metal panel 70 of FIG. 4 do not have locking fingers as do the top metal panel 56 and the bottom metal panel 30 of FIG. 4, as no such locking fingers are needed. The top thermo-bond film 92 and the bottom thermo-bond film 72 each have characteristics allowing them to serve as heat-activated adhesive films with a combined outer metal and inner plastic frame as an insulating layer for the PCBA 90. An example of a commercially-available product used as the top thermo-bond film 92 and the bottom thermo-bond film 72 is TBF668, made by 3M of Santa Clara, Calif., although other thermal-bond films may be employed.

The embodiment of FIG. 4 is now briefly described with reference to its manufacturing. On top of the bottom metal panel 70 is placed a slim USB male plug connector 74 serving to insulate the PCBA 90 from the bottom metal panel 70, as the latter is made of metal, in one embodiment of the present invention. Without the bottom thermo-bond film 72 and in the case where the bottom metal panel 70 is made of metal, the PCBA 90 would obviously short circuit with the bottom metal panel 70 rendering the former inoperational.

On top of the bottom thermo-bond film 72 is placed a frame 84, which is made of plastic or non-metal, i.e. non-conductive, yet substantially rigid material. The frame 84 is shown to include cavities, such as the cavities 93 and 91, into which various components are places, as will be shortly evident.

A retractable slim USB male plug connector sub-assembly 98 is shown in FIG. 4, which is essentially the retractable slim USB plug connector 20 of FIG. 1. The retractable slim USB male plug connector sub-assembly 98 is shown to include a slim USB male plug connector 74, the connector connection pads 22 with connection wire 94 extending therebeyond and into a flexible cable 73 shown interposed substantially between the connector connection pads 22 and a flexible cable connector 76. The retractable slim USB male plug connector sub-assembly 98 is pushed back and inserted into the cavities 91 of the frame 84 and in an area located to the left of the frame 84, as indicated generally at 86. While not shown in FIG. 4, optionally, the frame 84 has the case grip notches 26 of FIG. 3, on either of its sides.

The connector connection pads 22 is inserted into the slim USB male plug connector 74 and together they removably connect to a counterpart USB female plug connector. The flexible cable 73 is a flexible cable substrate that is mounted onto the connector connection pads 22 and includes connection wire 94, which couple electrical signals received through the connector connection pads 22 to the PCBA 90 when the device 10 is connected to another USB device. The flexible cable 73 is shown interposed between the flexible cable connector 76 and the connector connection pads 22. The slim USB male plug connector 74 is made of plastic material in one embodiment of the present invention, however, alternatively, it may be made of metal. The sub-assembly 98 is mounted onto the PCBA 90 and then placed onto the frame 84.

In an area generally located on the left side of the frame 84 and within the cavities 48, the PCBA 90 is placed and essentially snapped into place to sit within the cavities 93 of the frame 84.

While not shown, flash memory IC is mounted onto the PCBA 90, as well as potentially other types of ICs. The mounted ICs may be mounted on a single side of the PCBA 90 or on both sides thereof, i.e. double-sided, as in TSOP although chip on board (COB), BGA or other types of IC mounts may be employed. Double-sided PCBA 90 is well suited for further compactness.

On top of the frame 84, in the embodiment of FIG. 4 and in contrast to the embodiment of FIG. 3, a metal frame 89 is placed covering the outer edges of the frame 84. This is done prior to the positioning of the top thermo bond film 92 and the top metal panel 96. It should be noted that the bottom thermo-bond film 72 and the top thermo bond film 92 are adhesively cured to their respective panels by heating the device 102 of FIG. 4.

In FIG. 4, once the PCBA 90 is inserted into the frame 84, the top isolation layer 54 may be optionally attached to the top metal panel 96. In one embodiment of the present invention, the top isolation layer 54 is not employed. Next, as previously explained, the top metal panel 96 is aligned and inserted into the engagement holes of the frame 84, which effectively closes the structure comprising the device 10 or as indicated in FIG. 4, the final assembly 102. A sub-assembly 100 is shown in FIG. 4 to provide a perspective angular view of the device 10 when the top cover is removed.

Optionally, the frame 84 includes a cutout hole 81 such that a light, for example Light Emitting Diode (LED) or light pipe 48 is mounted on the PCBA 90 and visible from the backside of the device 10. The light pipe 88 reflects a light that which depending on its state of either on or off is indicative of the operational state of the device 10. Still optionally, the top isolation layer 54 and bottom Isolation layer 34 may be affixed to their respective layers. Both top thermo bond film 92 and bottom thermo-bond film 72 are optional.

In FIG. 4, after insertion and placement of the retractable slim USB male plug connector sub-assembly 98 into the frame 84, the plug connector 78 is pressed to cover the slim USB male plug connector 74 on the top side of the frame 84 encompassing the frame 84 in a manner as to make sufficient physical contact for the plug connector 78 to be able to cause the slim USB male plug connector 74 to move up and down the top cover slot 14 (in FIG. 1).

The connection wire 94 (or the connection wire 15 or 52), in one embodiment of the present invention, is made of Kapton material to flexibly extend or retract following the movement of the slim USB male plug connector 74.

It should be noted that the top metal panel 96, which is similar the bottom metal panel 30, is similar to the top cover 12 of FIG. 1. The metal frame 89 and the frame 84 both serve as insulation of the PCBA 90. In one embodiment of the present invention, as previously indicated, the PCBA 90 is made of FR4.

The final assembly 64 (which is essentially an example of the device 10) of FIG. 3 shows the retractable slim USB plug connector 20 retracted, whereas, the final assembly 102 (which is another example of the device 10) of FIG. 4 shows the retractable slim USB plug connector 20 'opened' or extending outwardly.

In the embodiments described herein, a user of the device 10 presses the sliding plug connector 18 down and outwardly to move the sliding plug connector 18 in an 'open' position or a position to cause extending of the retractable slim USB plug connector 20 in an outwardly direction relative to the device 10 or in a position exposing the retractable slim USB plug connector 20 for connection to a mating USB plug. For example, if the connector 20 is a male type of connector, it plugs into or be connected to a female connector of another USB device and if the connector 20 is a female type connector, it plugs into a male connector of another USB device. By pushing or pressing down and moving the sliding plug connector 18 in an opposite direction as the direction for 'opening' it, the sliding plug connector 18 is retracted and the retractable slim USB plug connector 20 is enclosed within the device 10 disallowing connection of the sliding plug connector 18 to another device and protecting the sliding plug connector 18 from damage while it is not in use.

Figure 5:
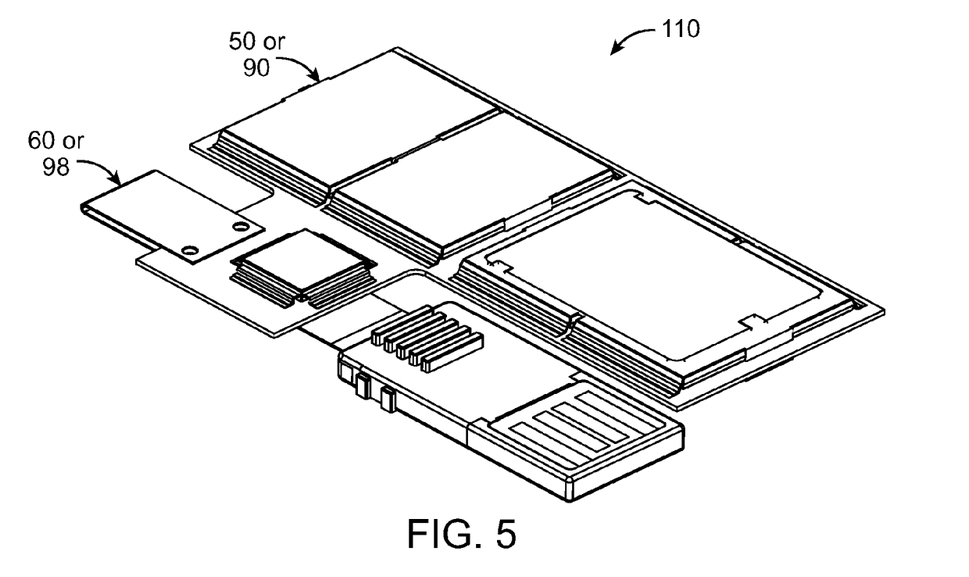
FIG. 5 shows a top perspective view of a PCBA/Retractable slim USB plug connector sub-assembly 110, of either of the embodiments of FIG. 3 or 4, in accordance with an embodiment of the present invention.

FIG. 5 shows a top perspective view of a PCBA/Retractable slim USB plug connector sub-assembly 110, of either of the embodiments of FIGS. 3 or 4, in accordance with an embodiment of the present invention. The sub-assembly 110 is shown to comprise of the PCBA 50 and the retractable slim USB plug connector sub-assembly 60 assembled together prior to being placed in the frame 44 or of the PCBA 90 and sub-assembly 98 prior to being placed into the frame 89.

Figure 6:
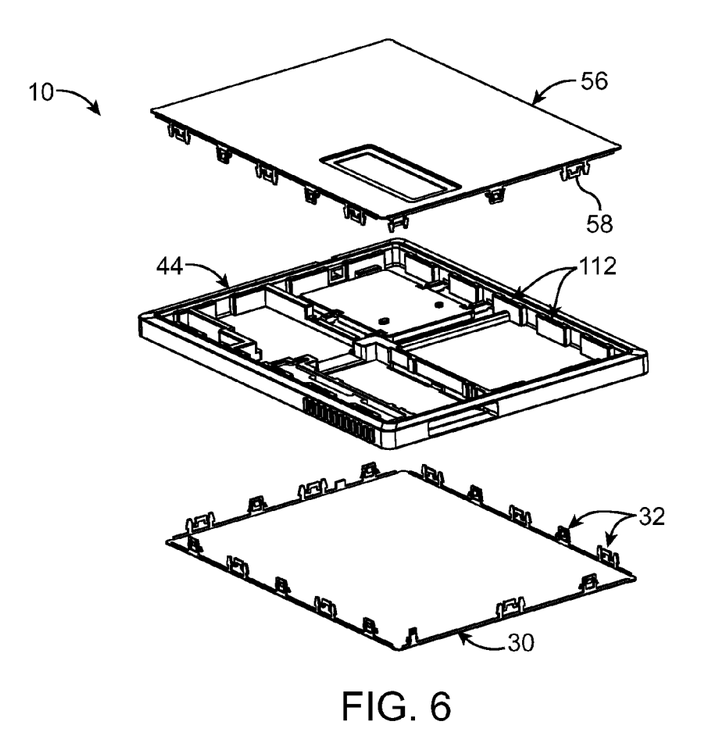
FIG. 6 shows further details of the device 10 in accordance with an embodiment of the present invention.

FIG. 6 shows further details of the device 10. In particular, the top metal panel 56 is shown to include the top locking fingers 58 as previously noted. The top locking fingers 58 are dispersed around and under the top metal panel 56 and fit into the frame slots 112, which are dispersed on the inner side of the frame 44. The frame slots 112 are slots that extend from the top to the bottom of the frame 44 and placed in positions so as to have the top locking fingers 58 correspondingly fit therein to snap the top metal panel 56 into the frame 44 from the top of the latter. The bottom locking fingers 32 of the bottom metal panel 30 fit into the frame slots 112, each in a corresponding frame slots 112 so as to have the bottom metal panel 30 snap into place wherein the top metal panel 56, the frame 44 and the bottom metal panel 30 form the device 10 once they are snapped into place and thereby provide a secure and rigid enclosure for the PCBA 50.

Figure 7:
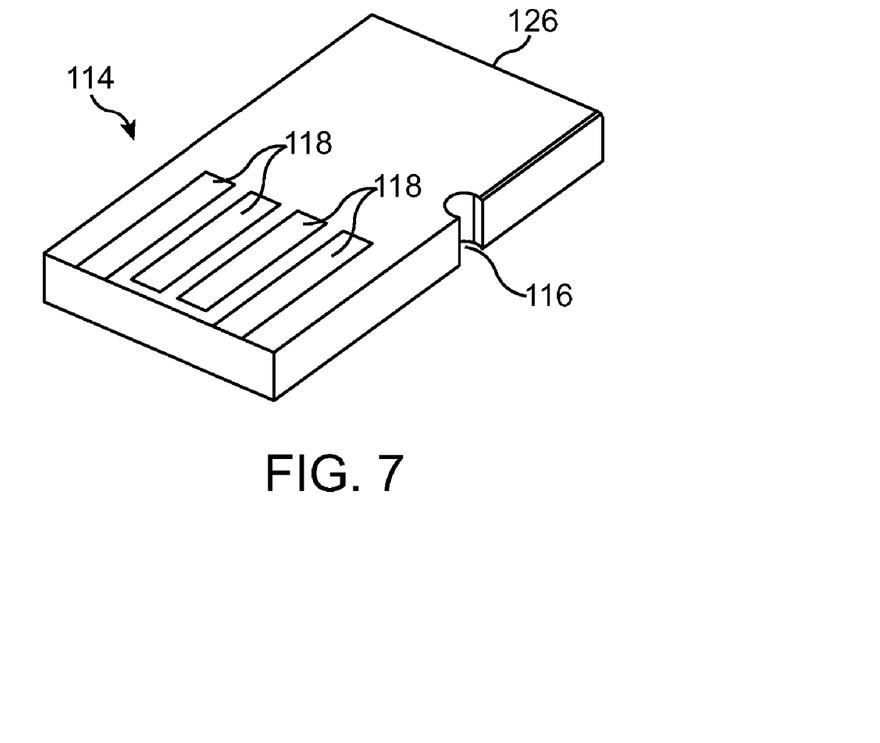
FIG. 7 shows a slim USB plug connector to include a number of metal contacts, in accordance with an embodiment of the present invention.
Figure 8:
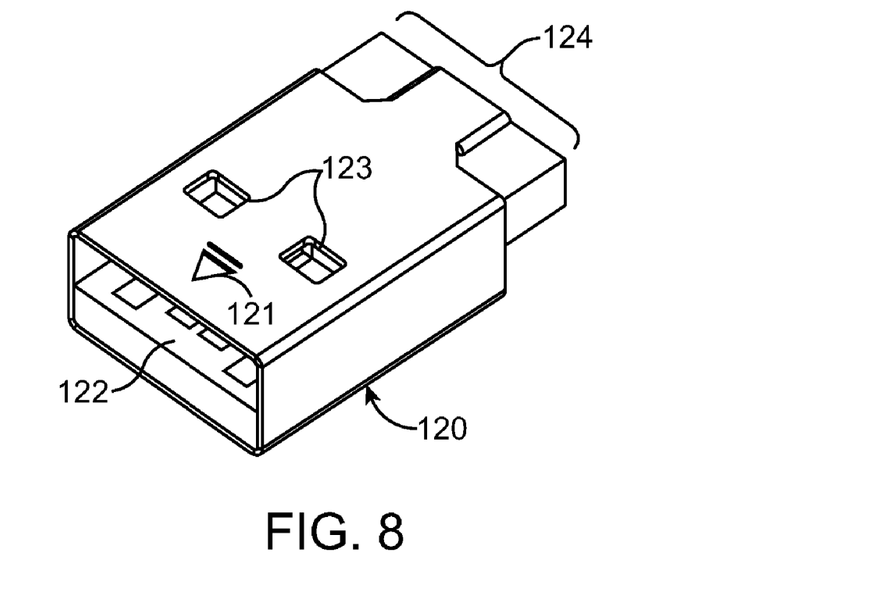
FIG. 8 shows a metal USB plug connector 120, in accordance with another embodiment of the present invention.

FIGS. 7 and 8 show various alternative embodiments of the slim USB plug connector 38 (or the slim USB male plug connector 74). In FIG. 7, a slim USB male plug connector 114 is shown to include a number of metal contacts 118, in accordance with an embodiment of the present invention. The contacts 18 are generally for causing the slim USB plug connector 114 to be in electrical contact with another mating connector. The slim USB plug connector 114 is further shown to include a notch 116 used for alignment or positioning with a case, such as the connector 20.

The connector 114 fits with the pads 22 at a side thereof shown at 126.

FIG. 8 shows a metal USB plug connector 120, in accordance with another embodiment of the present invention. The connector 120 is shown to include a double-sided PCBA 122 which the connector fully encapsulates and therefore protects. In another embodiment of the present invention, the PCBA 122 may be single-sided. The PCBA 122 is disposed inside of the connector 120 and substantially in the middle therein, although, in other embodiments, the PCBA 122 need not be in the middle. The direction of the arrow at 121 shows the direction in which the connector 120 is inserted, i.e. facing upward, into a mating USB connector. The two notches 123 shown on top of the connector 120 may be used for locking into a socket/receptacle.

The connector 114 fits with the pads 22 at a side thereof shown at 126.

It should be noted that the objects and structures shown in the various figures referred to herein are not drawn to scale.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A super slim compact flash (CF) light Universal Serial Bus (USB) device comprising:
   a top cover;
   a top cover slot formed within the top cover and forming a top cover slot cavity;
   a sliding plug connector positioned within the cavity and flexibly movable therein;
   a plastic frame disposed below and around the top cover;
   a retractable slim USB plug connector sub-assembly on top of which and connected thereto is placed the sliding plug connector, the retractable slim USB plug connector sub-assembly including a retractable slim USB plug connector positioned within the device to be flexibly retracted from or pulled into the device by the sliding plug connector for causing connection to a mating USB plug connector;
   case grip notches located on two sides of the device for easy gripping of the device;
   a Printed Circuit Board Assembly (PCBA) on which the retractable slim USB plug connector sub-assembly is mounted, wherein the PCBA includes at least one Integrated Circuit (IC);
   a frame into which the PCBA and retractable slim USB plug connector sub-assembly are mounted,
   wherein the retractable slim USB plug connector sub-assembly further includes connector connection pads, connection wire, a flexible cable and a flexible cable connector, the connector connection pads for fitting into the slim USB plug connector for establishing electrical connection with another USB device, the connection wire, connected between the connector connection pads and the flexible cable connector for coupling the connector connection pads to the flexible cable connector through the flexible cable.

2. A super slim compact flash (CF) light Universal Serial Bus (USB) device, as recited in claim 1, wherein the retractable slim USB plug connector is a male plug connector.

3. A super slim compact flash (CF) light Universal Serial Bus (USB) device, as recited in claim 1, wherein the retractable slim USB plug connector is a female plug connector.

4. A super slim compact flash (CF) light Universal Serial Bus (USB) device, as recited in claim 1, further including a top isolation layer and a bottom isolation layer, the top isolation layer disposed above the frame and the bottom isolation layer disposed below the frame.

5. A super slim compact flash (CF) light Universal Serial Bus (USB) device, as recited in claim 4, further including a top metal panel and a bottom metal panel, the top metal panel disposed above the top isolation layer and the bottom metal panel disposed below the bottom isolation layer.

6. A super slim compact flash (CF) light Universal Serial Bus (USB) device, as recited in claim 5, wherein the top metal panel includes a plurality of top locking fingers dispersed on the sides and bottom of the top metal panel for snapping the top metal panel in place to encapsulate the PCBA.

7. A super slim compact flash (CF) light Universal Serial Bus (USB) device, as recited in claim 5, wherein the bottom metal panel includes a plurality of bottom locking finger dispersed on the sides and bottom of the bottom metal panel for snapping the bottom metal panel in place to encapsulate the PCBA.

8. A super slim compact flash (CF) light Universal Serial Bus (USB) device, as recited in claim 7, wherein the PCBA is double-sided.

9. A super slim compact flash (CF) light Universal Serial Bus (USB) device, as recited in claim 7, wherein the PCBA is a chip on board (COB) assembly.

10. A super slim compact flash (CF) light Universal Serial Bus (USB) device, as recited in claim 1, further including a top thermo bond film and a bottom thermo-bond film, the top thermo bond film disposed above the frame and the bottom thermo-bond film disposed below the frame.

11. A super slim compact flash (CF) light Universal Serial Bus (USB) device, as recited in claim 10, further including a top metal panel and a bottom metal panel, the top metal panel disposed above the top thermo bond film and the bottom metal panel disposed below the bottom thermo-bond film.

12. A method of making the a super slim compact flash (CF) light Universal Serial Bus (USB) device in according to claim 1 comprising:
positioning the sliding a plug connector within the top cover slot cavity of the top cover lot of the a top cover formed;
sliding the sliding plug connector positioned within the cavity so that the sliding plug connector is flexibly movable within the cavity;
mounting the printed circuit board assembly PCBA and the retractable slim USB plug connector sub-assembly in the plastic frame; and
positioning the retractable slim USB plug connector within the device to be flexibly retracted from or pulled into the device by the sliding plug connector for causing connection to the a mating USB plug connector.

13. The method of making the a super slim compact flash (CF) light Universal Serial Bus (USB) device, as recited in claim 12, further including the step of snapping the a top cover on top of the frame and a bottom cover at the bottom of the frame to enclose the frame.

14. The method of making the super slim compact flash (CF) light Universal Serial Bus (USB) device, as recited in claim 13, wherein the retractable slim USB plug connector is a male plug connector.

15. A super slim compact flash (CF) light Universal Serial Bus (USB) device comprising:
a top cover;
a top cover slot formed within the top cover and forming a top cover slot cavity;
a sliding plug connector positioned within the cavity and flexibly movable therein;
a plastic frame disposed below and around the top cover; and
a retractable sub-assembly means on top of which and connected thereto is placed the sliding plug connector, the retractable sub-assembly means including a retractable slim USB plug connector positioned within the device to be flexibly retracted from or pulled into the device by the sliding plug connector for causing connection to a mating USB plug connector;
a Printed Circuit Board Assembly (PCBA) on which the retractable sub-assembly means is mounted, wherein the PCBA includes at least one Integrated Circuit (IC);
a frame into which the PCBA and retractable slim USB plug connector sub-assembly are mounted,
wherein the retractable sub-assembly means further includes connector connection pads, connection wire, a flexible cable and a flexible cable connector, the connector connection pads for fitting into the slim USB plug connector for establishing electrical connection with another USB device, the connection wire, connected between the connector connection pads and the flexible cable connector for coupling the connector connection pads to the flexible cable connector through the flexible cable.

16. A super slim compact flash (CF) light Universal Serial Bus (USB) device, as recited in claim 15, wherein the retractable slim USB plug connector is a female plug connector.

17. A super slim compact flash (CF) light Universal Serial Bus (USB) device, as recited in claim 15, further including a top isolation layer and a bottom isolation layer, the top isolation layer disposed above the frame and the bottom isolation layer disposed below the frame.

18. A super slim compact flash (CF) light Universal Serial Bus (USB) device, as recited in claim 17, further including a top metal panel and a bottom metal panel, the top metal panel disposed above the top isolation layer and the bottom metal panel disposed below the bottom isolation layer.

19. A super slim compact flash (CF) light Universal Serial Bus (USB) device, as recited in claim 18, wherein the top metal panel includes a plurality of top locking fingers dispersed on the sides and bottom of the top metal panel for snapping the top metal panel in place to encapsulate the PCBA.

20. A super slim compact flash (CF) light Universal Serial Bus (USB) device, as recited in claim 18, wherein the bottom metal panel includes a plurality of bottom locking finger dispersed on the sides and bottom of the bottom metal panel for snapping the bottom metal panel in place to encapsulate the PCBA.

21. A super slim compact flash (CF) light Universal Serial Bus (USB) device, as recited in claim 20, wherein the PCBA is double-sided.

22. A super slim compact flash (CF) light Universal Serial Bus (USB) device, as recited in claim 20, wherein the PCBA is a chip on board (COB) assembly.

23. A super slim compact flash (CF) light Universal Serial Bus (USB) device, as recited in claim 15, further including a top thermo bond film and a bottom thermo-bond film, the top thermo bond film disposed above the frame and the bottom thermo-bond film disposed below the frame.

24. A super slim compact flash (CF) light Universal Serial Bus (USB) device, as recited in claim 23, further including a top metal panel and a bottom metal panel, the top metal panel disposed above the top thermo bond film and the bottom metal panel disposed below the bottom thermo-bond film.

* * * * *